Figure 1:
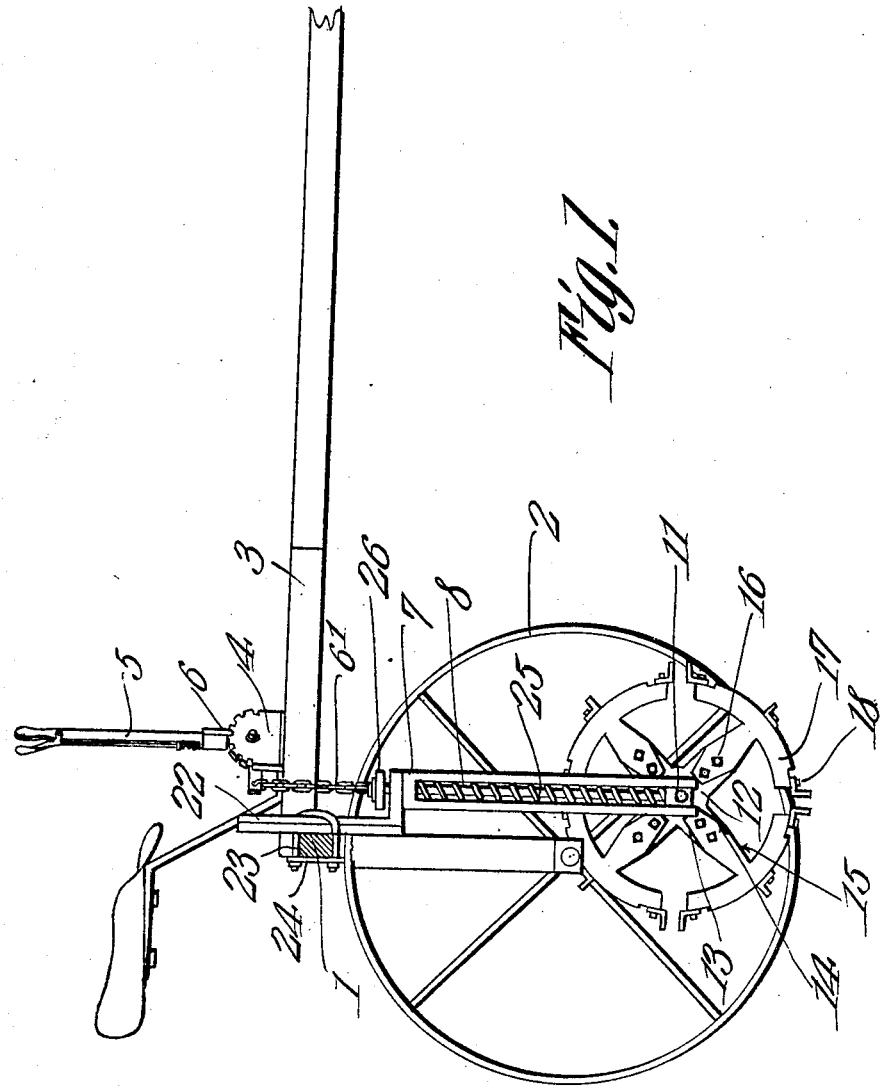

R. R. HYLAND.
COTTON CHOPPER.
APPLICATION FILED JULY 30, 1908.

913,729.

Patented Mar. 2, 1909.
2 SHEETS—SHEET 1.

Witnesses

Inventor
Robert R. Hyland,
By C. A. Snow & Co.
Attorneys

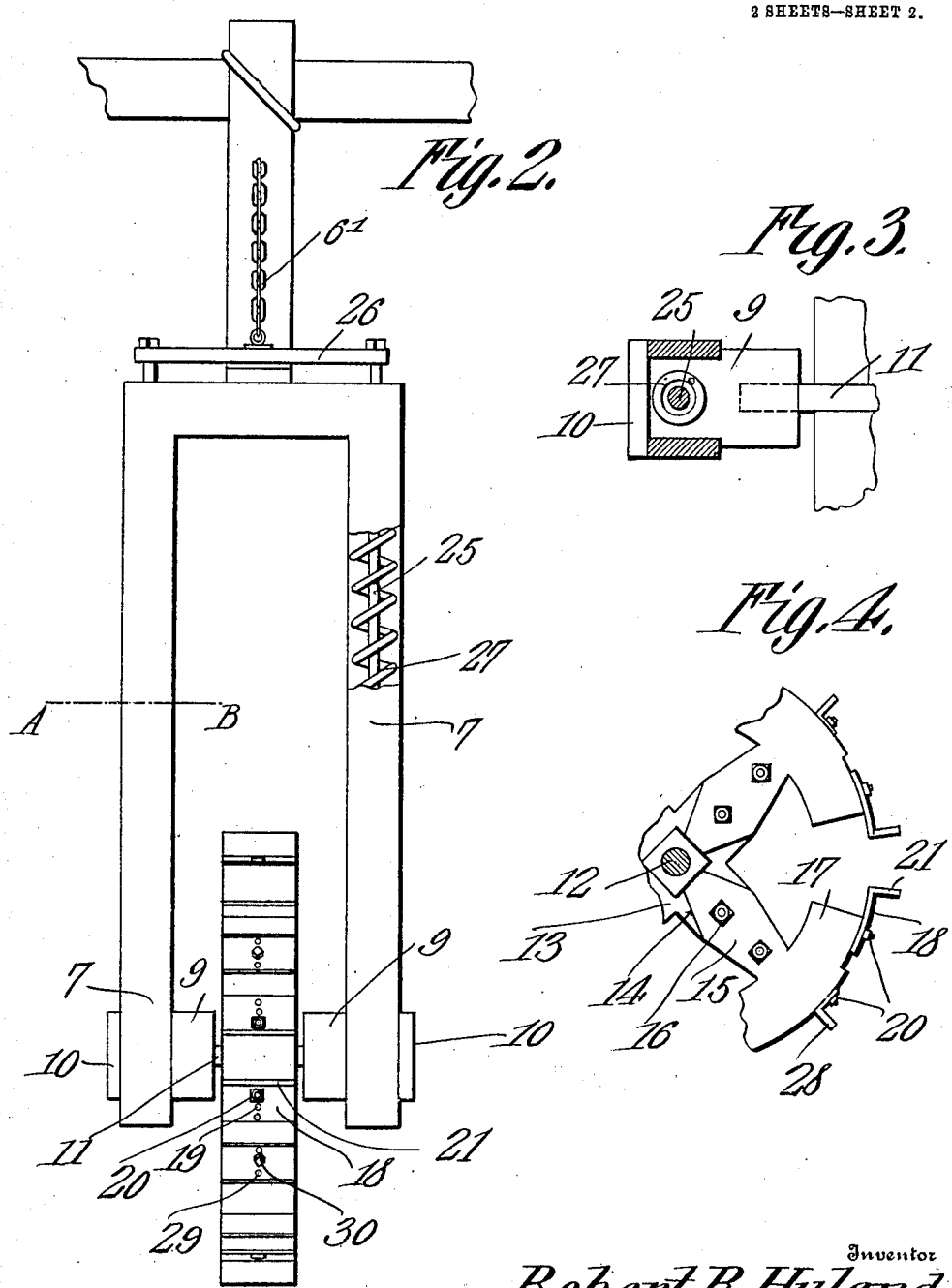

UNITED STATES PATENT OFFICE.

ROBERT R. HYLAND, OF ROUND ROCK, TEXAS.

COTTON-CHOPPER.

No. 913,729.　　　　Specification of Letters Patent.　　　Patented March 2, 1909.

Application filed July 30, 1908.　Serial No. 446,138.

To all whom it may concern:

Be it known that I, ROBERT R. HYLAND, a citizen of the United States, residing at Round Rock, in the county of Williamson and State of Texas, have invented a new and useful Cotton-Chopper, of which the following is a specification.

This invention relates to cotton choppers and is more particularly designed as an improvement upon the device described and claimed in Patent No. 591,972 issued to me on Oct. 19, 1897.

The object of the invention is to provide improved means for controlling the operation of the chopping wheel, means being provided whereby said wheel can be conveniently shifted out of operative position or moved into lowered or operative position, there being yieldable means for causing the wheel to automatically adjust itself to undulations or other irregularities of the surface over which the wheel travels.

With these and other objects in view the invention consists of certain novel features of construction and combinations of parts which will be hereinafter more fully described and pointed out in the claim.

In the accompanying drawings is shown the preferred form of the invention.

In said drawings: Figure 1 is a side elevation of a machine constructed in accordance with the present invention, the near wheel thereof being removed. Fig. 2 is a view partly in rear elevation and partly in section of the wheel-carrying frame and the adjoining portion of the arched axle of a cultivator, the wheel being shown in elevation within the frame. Fig. 3 is a horizontal section through one side of the frame, said section being taken on the line "A—B", Fig. 2. Fig. 4 is an enlarged side elevation of a portion of the chopping wheel.

Referring to the figures by characters of reference, 1 designates the arched axle of a cultivator, which axle is mounted upon supporting wheels in the usual manner, one of the wheels being shown at 2. A frame 3, of any preferred form, is carried by the axle, and mounted on this frame is a toothed sector 4, on which is pivotally mounted a bell-crank lever 5, having a pawl 6, designed to engage the sector and lock the lever in any position to which it may be adjusted. A chain 6', or other flexible device, extends downward from the lower arm of the bell-crank lever and is for the purpose hereinafter set forth.

Arranged below the axle and preferably in front thereof, is a forked frame 7. Each side of the frame is slotted longitudinally as indicated at 8, there being a block 9 mounted to reciprocate within each slot, said blocks being retained in position within the slots in any suitable manner as by means of cap-plates 10. These blocks 9 constitute bearings for an axle 11 on which the chopping wheel 12 is mounted. Said chopping-wheel has radial spokes 13 thereon provided with recesses 14 in which are seated spoke extensions 15, which are held in place by means of bolts 16, or other suitable securing devices. Each of these extensions has an arcuate or segmental end portion 17, all of said portions being concentric with the center of the wheel and having plates 18 mounted upon the outer surface of the end portions thereof. Each of these plates is preferably provided with a series of openings 19, any one of which is designed to receive a clamping bolt 20, and obviously by mounting the plates in this manner they can be adjusted toward or from each other so as to regulate the sizes of the openings between the sections 17. The free ends of the plates 18 have blades 21 extending therefrom substantially at right angles thereto.

Secured upon the central portion of the top of frame 7 is an L-shaped hanger 22, the upstanding portion of which is designed to bear against the flat front face of the upper portion of the arched axle 1, and to be clamped upon said face by means of a "U" bolt 23 engaging the end portions of a retaining plate 24. By loosening the bolt 23 the hanger 22 can be adjusted vertically so as to support the wheel 12 at any desired elevation relative to the axle.

Secured to and extending upwardly from each block 9 is a rod 25 and these rods extend through the upper end of the frame 7 and are connected to a cross-head 26. The chain 6' heretofore referred to is attached to this cross-head as clearly indicated in Figs. 1 and 2. Coiled springs 27 are disposed within the slots 8 and around the rods and each spring bears at one end against the block 9 thereunder, while its other end bears against the upper wall of the slot 8. It will be understood of course that by manipulating the lever 5 the cross-head 26 can be pulled upwardly by the chain 6', a corresponding movement of the blocks 9 and the wheel carried thereby will be produced.

By providing spoke extensions 15 of different lengths, the diameter of the chopping wheel can be increased or diminished, and by adjusting the plates 18 toward or from each other, the sizes of the openings between the sections 17 can be regulated so that any desired number of plants can be left standing. When the lever 5 is released the springs 27 will force the blocks 9 downward and cause the wheel 12 to push against the ground. As the machine is drawn forward this wheel will rotate and the sections 17 and plates 18 will crush those of the plants thereunder, while the remaining plants which come within the spaces between the blades 21 will be left standing. By reason of these various adjustments the number of plants left standing and the distances between them can be controlled.

The provision of the "U" bolt 23 enables the device to be attached to an axle at any point thereon. The device can therefore be used in connection with axles of different sizes, and can be located at different distances from the ground. The frame can be readily disconnected from the axle and the whole device constitutes an efficient attachment capable of use in connection with various forms of cultivators.

As shown particularly in Figs. 1 and 4, each of the segmental sections 17 of the wheel 12 is preferably provided at a point adjacent the center thereof with an auxiliary blade 28 which is held in place by means of a bolt 29 insertible through any one of a series of openings 30, so that said blade can be readily adjusted upon the sections 17.

Arranged in rear of the axle 1 is a forked frame 7 each side of which is slotted longitudinally as indicated at 8, there being a block 9 mounted to reciprocate within each slot and being retained in position therein in any suitable manner as by means of a cap plate 10. These blocks 9 constitute bearings for an axle 11 on which the chopping wheel 12 is mounted. Said chopping wheel has radial spokes 13 thereon provided with guide bolts 14 which bolts project laterally from the spokes and through slots 15 provided within spoke extensions 16. Each of these extensions has an arcuate or segmental end portion 17, all of said portions being concentric with the center of the wheel and having plates 18 mounted upon the outer surface of the end portions thereof. These plates are preferably slotted longitudinally as indicated at 19 so as to receive clamping bolts 20 and by mounting the plates in this manner they can be adjusted toward or from each other so as to regulate the sizes of the openings between the sections 17. The free ends of the plates 18 have blades 21 extending therefrom substantially at right angles thereto.

Extending through each slot 8 is a U-bolt 22 which embraces the arched portion of the axle and engages a holding strip 23. Obviously by tightening these bolts the frame 7 can be secured in any desired position relative to the axle 1. Secured to and extending upwardly from each block 9 is a rod 24 and these rods extend through the upper end of the frame and are connected to the cross head 25. Coiled springs 26 are disposed within the slots 8 and around the rods and each spring bears at one end against the block 9 thereunder while its other end bears against the upper wall of the slot 8. A chain or other flexible device 27 connects the middle portion of the cross head 25 with one end of a lever 28 fulcrumed upon a standard 29 on frame 3, there being a pawl 30 and a toothed sector 31 coöperating to lock the lever at any angle relative to the frame 3. Obviously by manipulating this lever the cross head 25 can be elevated or lowered so as to produce a corresponding movement of the blocks 9 and the wheel carried thereby.

By adjusting spoke extension 16 longitudinally the diameter of the chopping wheel can be increased or diminished and by further adjusting the plates 18 toward or from each other the sizes of the openings between the sections 17 can be regulated so that any desired number of plants can be left standing. When the lever 28 is released the springs 26 will force the blocks 9 downward and cause the wheel 12 to push against the ground. As the machine is drawn forward this wheel will rotate and the sections 17 and plates 18 will crush those of the plants thereunder while those of the plants which come within the spaces between the blades 21 will be left standing. Obviously by adjusting the sections 17 toward or from the center of the wheel and by adjusting plates 18 toward or from each other the number of the plants left standing and the distances between them can be controlled. By providing the U-bolts 22 frame 7 can be attached at any desired points to the axle 1. Said frame can therefore be used in connection with axles of different sizes and located at different distances from the ground. Said frame can be readily disconnected from the axle and the whole device constitutes an efficient attachment capable of use in connection with various forms of cultivators.

What is claimed is:

A cotton chopper attachment for cultivators and the like comprising a forked guide frame, opposite portions of said frame being slotted longitudinally, a block slidably mounted upon each slotted portion of the frame, each block having a reduced portion extending into the slot, cap plates secured to the reduced portions of the blocks and bearing upon the slotted portions of the frame, a chopping wheel mounted between and carried by the blocks, a cross-head, rods secured thereto and extending into the slotted portions of the frame and attached to the blocks, said rods being parallel and slidably mounted in the frame, flexible means extending from the cross-head for attachment to elevating means, and an L-shaped hanger upon the middle portion of the frame and extending upwardly therefrom, the upstanding portion of said hanger having a flat bearing face and a rounded bolt-engaging face, and springs upon the rods and within the slots for bearing downwardly upon the blocks.

In testimony that I claim the foregoing as my own, I have hereto affixed my signature in the presence of two witnesses.

ROBERT R. HYLAND.

Witnesses:
JOHN A. HYLAND,
ZORAH HYLAND.